(No Model.)  2 Sheets—Sheet 1.

P. MOËSSARD.
PANORAMIC PHOTOGRAPH CAMERA.

No. 429,792.   Patented June 10, 1890.

Witnesses:
Aug. Dieterich.
John W. Speer.

Inventor
Paul Moëssard
By Briesen, Steele & Knauth
Attorneys.

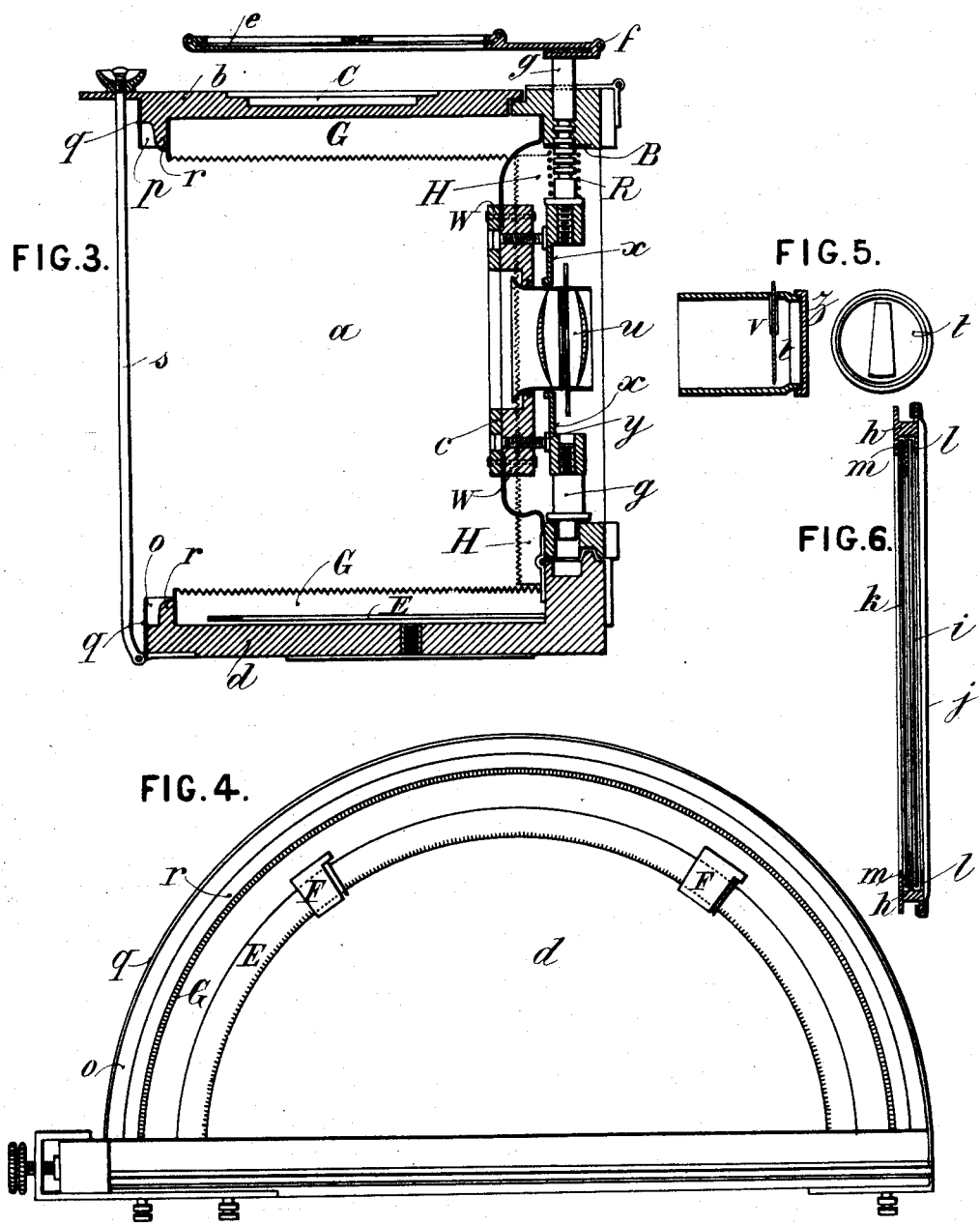

UNITED STATES PATENT OFFICE.

PAUL MOËSSARD, OF PARIS, FRANCE.

PANORAMIC PHOTOGRAPH-CAMERA.

SPECIFICATION forming part of Letters Patent No. 429,792, dated June 10, 1890.

Application filed November 1, 1889. Serial No. 328,915. (No model.) Patented in France June 17, 1884, No. 162,815; in Belgium June 21, 1884, No. 65,551, and in England June 26, 1884, No. 9,461.

*To all whom it may concern:*

Be it known that I, PAUL MOËSSARD, of the city of Paris, France, have invented an Improved Panoramic Photograph-Camera, (for which I have obtained Letters Patent in France for fifteen years, dated June 17, 1884, No. 162,815; in Belgium for fifteen years, dated June 21, 1884, No. 65,551, and in England for fourteen years, dated June 26, 1884, No. 9,461,) of which the following is a full, clear, and exact description.

This invention relates to a panoramic camera for producing in relatively correct cylindrical perspective the photographic image of a panorama, landscape, or other view comprised within a wide angle and at any distance. The camera is semi-cylindrical, and the lens is mounted to rotate upon a vertical axis, so that by turning it through the entire arc comprised by the camera the whole of the film, which is bent to a semi-cylindrical curvature, may be progressively impressed with the image of the landscape or other view which has been brought within the field of the lens.

The invention relates to the details of construction of the camera.

Reference is to be had to the accompanying drawings, forming part of this specification, wherein—

Figure 1:
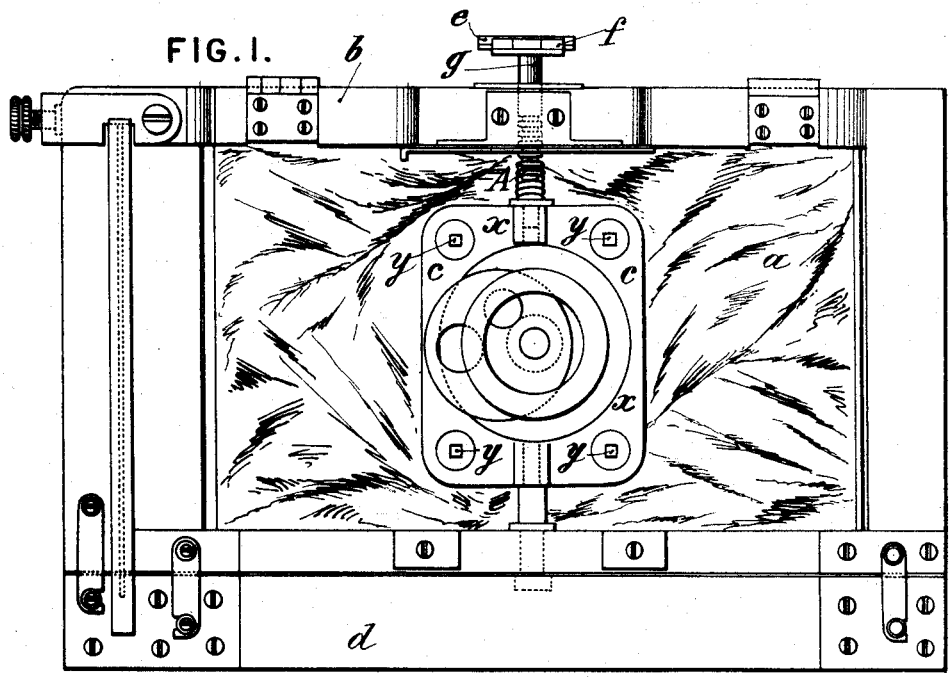
Figure 2:
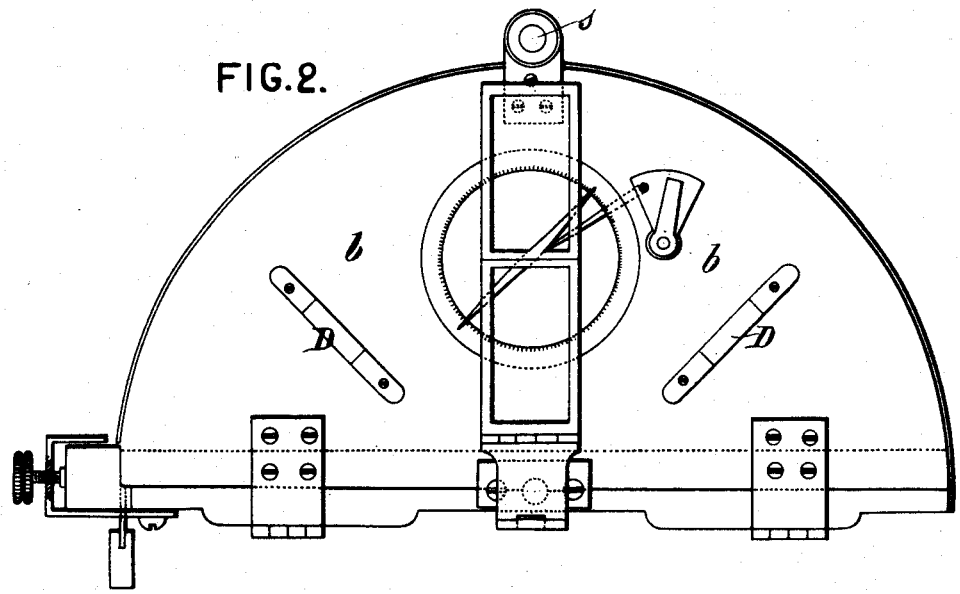

Figure 1 represents a front view, Fig. 2 a plan, and Fig. 3 a vertical section, of my improved camera. Fig. 4 is a plan of the camera-bottom. Fig. 5 shows a longitudinal section and face view of a lens-hood. Fig. 6 is a cross-section of the film-holder.

The same letters of reference serve for like parts in all the figures.

The camera $a$ is formed of a semicircular top and bottom $b$ $d$, and a front frame $c$ of rectangular form, the parts being hinged to each other, so as to be capable of folding together for transport.

$g$ is the vertical axis, on which the lens is mounted to rotate by means of a handle or arm $e$, hinged thereto at $f$. The camera has no semicircular back, as usual in such cameras, but is closed at this part during exposure by the film-holder itself. This film-holder $h$, Fig. 6, is of flexible material—such as celluloid, for example—which is capable of being laid flat for transport, but when placed in position for exposure is bent to a semi-cylindrical form. The film-holder $h$ is closed at front and back by two sliding shutters $i$ $k$, of thin pasteboard, covered with fabric, sliding in grooves $l$ $m$ in the long sides of holder $h$, which are prevented from spreading by metal clips or braces $j$. The holder $h$ is inserted in semicircular grooves $o$ $p$, formed between the brass strips $q$ and the flanges $r$. The shutter is drawn out for exposure in the ordinary way and folded back between the film-holder and the tie-rod $s$.

In order to limit the field of exposure at any given moment and to enable the relative duration of exposure of the sky and foreground to be varied at will, a metal hood $t$ is applied to the lens-tube and has a slit $v$ behind its front edge, in which is inserted a diaphragm of metal, black celluloid, or black card-board, for the purpose of limiting the field of the lens. This diaphragm, which is placed in front of the lens, forms a very important feature, as it can be made of any form desired, so as to vary the relative exposure of the sky and foreground and limit the impression to a narrow band.

$z$ is the cap for closing the end of hood $t$ in front of the diaphragm. The lens-board $w$ is connected to a metal plate $x$, having a central opening, through which the lens-tube passes freely.

$y$ are four adjusting-screws having squared heads, by adjusting which the lens-tube is moved forward or backward until the nodal point of emergence of the lens is coincident with the axis $g$, which can be ascertained by receiving the image upon a ground-glass screen placed in position at the back of the camera and turning the lens on its axis $g$. If the nodal point coincides with the axis $g$, the image will remain stationary; but if otherwise it will shift.

The vertical adjustment of the lens is permitted by means of a locking-bolt B, having a key-hole-shaped slot, which engages with circumferential notches A in the axis $g$. By sliding the bolt B in one direction the axis $g$ is free to pass freely through the slot in the bolt, which after adjustment is moved in the opposite direction to lock the axis in the vertical direction. A spiral spring R exerts a downward pressure upon plate $x$ and prevents vertical oscillation thereof. For use in operating and adjusting the camera a magnetic compass C, having a graduated movable limb for adjusting the position of the camera, and two spirit-levels D D at right angles to each other are fitted on the top of the camera. (See Fig. 2.)

E, Fig. 4, is a graduated limb on bottom plate $d$, divided into degrees like the compass, and having two sliders F F, which are applied to the graduations corresponding to those marked by the compass, differing therefrom by one hundred degrees. One of the sliders carries an arrow and the other a crescent, of which, when raised to a vertical position, the outlines are impressed on the negative, thereby indicating two magnetic cardinal points. Similarly the limbs G are notched in degrees, and two other straight vertical notched scales H are fixed internally to the uprights of the camera-frame, and of which each division is equal to a hundredth part of the distance of each scale-strip from the axis of rotation. By this means there is impressed upon the negative at top and bottom the scale of azimuths in degrees and a right and left scale of height in hundredths.

I claim—

1. A panoramic camera for producing the photographic image of a landscape or other view comprised within a wide angle in relatively correct cylindrical perspective, in which the top and bottom plates are hinged so as to fold down upon the front, in combination with a compass having a graduated movable limb for adjusting the position of the camera, as hereinbefore described, and illustrated in the drawings.

2. A folding panoramic camera constructed of a semicircular top and bottom $b\ d$, and front lens, carrying frame $c$, hinged together and closed at back during exposure by a flexible film-holder $h$, provided with shutters $i\ k$, as described.

3. In a panoramic camera, the combination of the graduated limbs E G H, as described, and for the purpose specified.

4. In a panoramic camera, the means for adjusting the lens, consisting of screws $y$, spiral spring R, and locking-bolt B, engaging in notches A in axis $g$, in combination with the handle or arm $e$, as described.

5. The combination, with the lens-tube of a photographic camera, of a detachable hood $t$, having a slit $v$ behind its front edge, with the detachable diaphragm placed in said slit, and with the cover $z$, adapted to be placed in front of said diaphragm over the hood, substantially as herein shown and described.

The foregoing specification of my improved panoramic photograph-camera signed by me this 11th day of October, 1889.

PAUL MOËSSARD.

Witnesses:
R. J. PRESTON.
ERNEST PIERRE CISSIER.